(12) United States Patent
Larsen et al.

(10) Patent No.: US 11,326,960 B2
(45) Date of Patent: May 10, 2022

(54) STANDOFF TEMPERATURE MEASUREMENT FOR FIRST RESPONDERS

(71) Applicant: Honeywell International Inc., Morris Plains, NJ (US)

(72) Inventors: Christopher Scott Larsen, Plymouth, MN (US); Cleopatra Cabuz, Eden Prairie, MN (US)

(73) Assignee: Honeywell International Inc., Morris Plains, NJ (US)

( * ) Notice: Subject to any disclaimer, the term of this patent is extended or adjusted under 35 U.S.C. 154(b) by 351 days.

(21) Appl. No.: 16/059,779

(22) Filed: Aug. 9, 2018

(65) Prior Publication Data

US 2019/0049315 A1 Feb. 14, 2019

Related U.S. Application Data

(60) Provisional application No. 62/543,009, filed on Aug. 9, 2017.

(51) Int. Cl.
| | |
|---|---|
| *G01K 1/00* | (2006.01) |
| *G01K 7/00* | (2006.01) |
| *G01K 1/143* | (2021.01) |
| *G01K 1/02* | (2021.01) |
| *A41D 19/00* | (2006.01) |
| *G01K 3/00* | (2006.01) |
| *A41D 19/015* | (2006.01) |

(52) U.S. Cl.
CPC .......... *G01K 1/143* (2013.01); *A41D 19/002* (2013.01); *A41D 19/0027* (2013.01); *G01K 1/02* (2013.01); *G01K 3/005* (2013.01); *A41D 19/01529* (2013.01); *A41D 2600/20* (2013.01); *G01K 2217/00* (2013.01)

(58) Field of Classification Search
USPC .......................................... 374/208, 141, 163
See application file for complete search history.

(56) References Cited

U.S. PATENT DOCUMENTS

| | | | | |
|---|---|---|---|---|
| 5,973,602 A | * | 10/1999 | Cole, III | A41D 31/085 340/584 |
| 2009/0188017 A1 | * | 7/2009 | Kruse | A41D 31/085 2/81 |
| 2009/0222973 A1 | * | 9/2009 | Merkle | A41D 19/0027 2/161.6 |

(Continued)

FOREIGN PATENT DOCUMENTS

EP 3315037 A1 * 5/2018 ....... A41D 19/01529

*Primary Examiner* — Mirellys Jagan
(74) *Attorney, Agent, or Firm* — Alston & Bird LLP

(57) ABSTRACT

Embodiments relate generally to systems and methods for determining the temperature of an object or surface near a user, such as a firefighter, in potentially dangerous conditions. A temperature sensor configured to be attached to a personal protection equipment may comprise a standoff temperature sensor element configured to detect the temperature of a nearby object or surface; a microcontroller configured to receive sensor data from the standoff temperature sensor element and determine the sensed temperature; an indicator configured to be activated by the microcontroller when the sensed temperature is higher than a predefined threshold; and an attachment element configured to attach the sensor to a personal protection equipment worn by a user.

19 Claims, 2 Drawing Sheets

(56) References Cited

U.S. PATENT DOCUMENTS

| | | | | |
|---|---|---|---|---|
| 2011/0265706 A1* | 11/2011 | Nicholls | ............... | A62C 99/00 |
| | | | | 116/201 |
| 2012/0144554 A1* | 6/2012 | Thellmann | ......... | A63B 21/4033 |
| | | | | 2/161.1 |
| 2014/0158673 A1* | 6/2014 | Gou | .................... | H05B 1/0272 |
| | | | | 219/211 |
| 2014/0375459 A1* | 12/2014 | Curtis | .................... | G08B 21/02 |
| | | | | 340/573.1 |
| 2015/0083704 A1* | 3/2015 | Guidry | ............... | A41D 19/0024 |
| | | | | 219/211 |
| 2016/0161301 A1* | 6/2016 | Guenther | ............. | A61B 5/6806 |
| | | | | 702/150 |
| 2016/0262924 A1* | 9/2016 | Abreu | ................ | A41D 19/0027 |
| 2017/0086513 A1* | 3/2017 | Maxey | ............... | A41D 13/0051 |
| 2017/0330437 A1* | 11/2017 | Hatanaka | ............... | G08B 21/02 |
| 2017/0372216 A1* | 12/2017 | Awiszus | ................ | A62B 27/00 |
| 2019/0328063 A1* | 10/2019 | McIntyre | ......... | A41D 19/01535 |
| 2021/0033472 A1* | 2/2021 | Turner | ............... | G06K 7/10891 |

\* cited by examiner

STANDOFF TEMPERATURE MEASUREMENT FOR FIRST RESPONDERS

CROSS-REFERENCE TO RELATED APPLICATIONS

The present application claims priority to U.S. Provisional Patent Application Ser. No. 62/543,009 filed Aug. 9, 2017 by Christopher Scott Larsen, et al. and entitled "Standoff Temperature Measurement for First Responders" which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Workers or individuals in hazardous work environments can encounter various hazards such as toxic gases, noise, and the like. As an example, firefighters may be exposed to several hazards while working. The workers may wear and/or carry personal protective equipment (PPE) to protect against anticipated hazards. Typically, for their safety, firefighters are heavily insulated from the high temperatures in their environment by wearing PPE.

SUMMARY

In an embodiment, a temperature sensor configured to be attached to a personal protection equipment may comprise a standoff temperature sensor element configured to detect the temperature of a nearby object or surface; a microcontroller configured to receive sensor data from the standoff temperature sensor element and determine the sensed temperature; an indicator configured to be activated by the microcontroller when the sensed temperature is higher than a predefined threshold; and an attachment element configured to attach the sensor to a personal protection equipment worn by a user.

In an embodiment, a method for determining the temperature of an object or surface near a user may comprise positioning a standoff temperature sensor element of a temperature sensor in proximity to the object or surface; receiving, by a microcontroller of the temperature sensor, sensed data from the standoff temperature sensor element; determining a sensed temperature based on the received sensed data; determining when the sensed temperature is higher than a predefined threshold; and activating an indicator when the sensed temperature is higher than the predefined threshold.

In an embodiment, a personal protection equipment may comprise an attachment element located on a portion of the personal protection equipment; and a temperature sensor configured to attach to the attachment element, wherein the temperature sensor comprises: a standoff temperature sensor element configured to detect the temperature of a nearby object or surface; a microcontroller configured to receive sensor data from the standoff temperature sensor element and determine the sensed temperature; an indicator configured to be activated by the microcontroller when the sensed temperature is higher than a predefined threshold; and an attachment element configured to attach the sensor to a personal protection equipment worn by a user.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
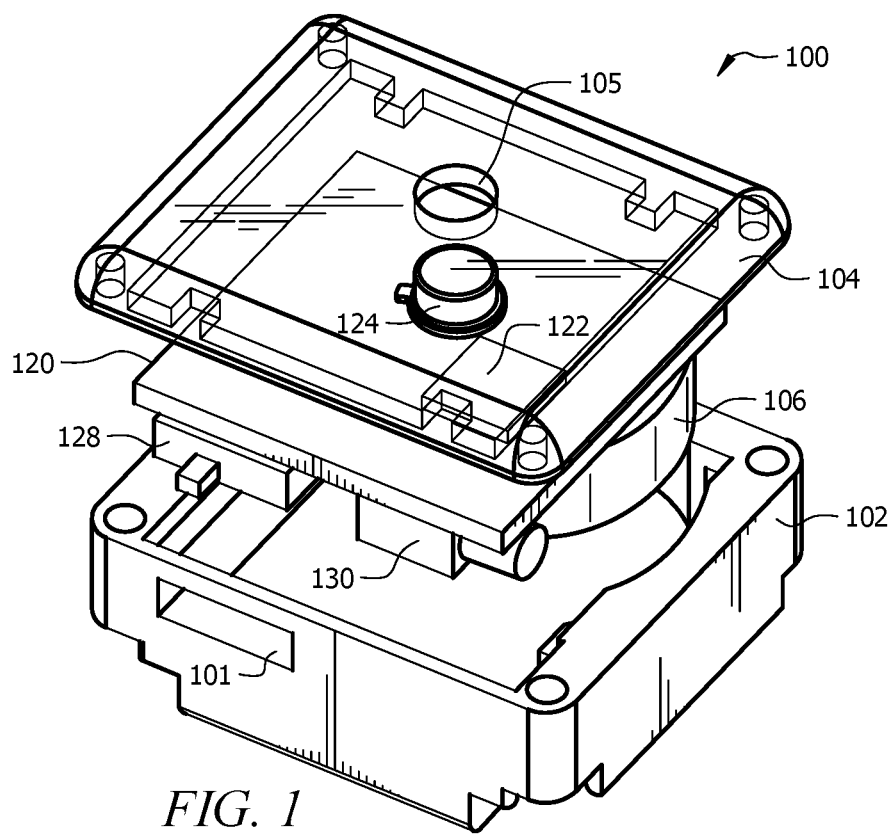
FIG. 1 illustrates a perspective, exploded view of a temperature sensor according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field (for example, ±10%); and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for determining the temperature of the environment around a firefighter during a first responder situation. Typically, for their safety, firefighters are heavily insulated from the high temperatures in their environment by wearing personal protection equipment (PPE). A side effect of this insulation is that they are unable to determine if objects in their vicinity are hot. For example, if a firefighter would like to determine if an adjacent room is hot, he would generally touch the door. However, the insulated gloves and other protective gear insulate the skin so well that the firefighter may be unable to feel any temperature at all. In many cases, the firefighter may remove his glove to touch the door with bare skin, negating the protection purposes of the PPE and presenting an unnecessary danger to the firefighter. Additionally, in many cases the firefighter may be carrying equipment (such as a hose) and his hands are not free to remove a glove and determine if an object or room is hot. One option for determining the temperature of objects in the environment around a firefighter is a thermal imager. However, the expense of a thermal imager may prohibit providing one to every firefighter (and handheld thermal imagers might not be practical, since firefighters often do not have a free hand).

Embodiments of the disclosure include a small, lightweight, low cost standoff temperature sensor that can be integrated directly into or attached to existing PPE worn by a user, such as gloves and helmets. The temperature sensor may be a standoff temperature sensor element (which may be a thermopile) that can measure temperature at a distance (e.g., within a range of 1 inch to 10 feet), and the sensor may be configured to provide an indication of temperature to the firefighter. Typically, such a temperature sensor would not comprise a thermal imaging element (e.g., due to cost and/or complexity). The indication may comprise a visible and/or audible indication. For example, a light may flash, a motor may vibrate, or a tone may sound if the temperature passes a certain threshold (e.g. 100° C.). Alternatively or additionally, the measured temperature may be mapped to the indicator in an analog fashion, so that hotter temperatures cause an indicator light to be brighter, or cause a louder or higher pitched tone, or cause a stronger motor vibration. Typically, the indicator would be configured to be easily noticed/detected by the firefighter/sensor despite difficult environmental conditions in a fire rescue and/or wearing of PEE. So for example, a vibration indicator might be sufficiently strong to be detected through the mounting PPE or might occur under the PPE or a tone might occur within/ under the PPE (e.g., under hearing protection). This lightweight sensor could be cheap and unobtrusive enough for all firefighters to carry one.

In an embodiment of a temperature sensor, a standoff temperature sensor element (or thermopile) may be mounted to a circuit board and may be configured to communicate temperature to a microcontroller (e.g., on the circuit board). The microcontroller may be configured to compare the reported temperature to a (preset) threshold or mapped to a table (e.g., a look-up table) that determines when the indicator (light, sound, or motor) should be activated and/or with what tone/intensity. The sensor may comprise a plastic housing with a rechargeable battery. Alternatively, the sensor module may be built with very small and flexible components and may be over-molded to form an exterior housing. The assembly of the sensor may also be permanently built into a glove or other PPE equipment. The assembly may also be attached to equipment, such as with a clip or adhesive. The battery may be recharged wirelessly or through a wired connection. In some embodiments, the assembly may be configured to be resistant to the extreme heat, etc. in a fire rescue situation. For example, the housing may include insulation and/or be sufficiently insulating to protect the sensor and/or microcontroller, the sensor may be heat-resistant, and/or one or more component might be housed under the PPE and communicatively coupled to the exterior components.

Figure 2:
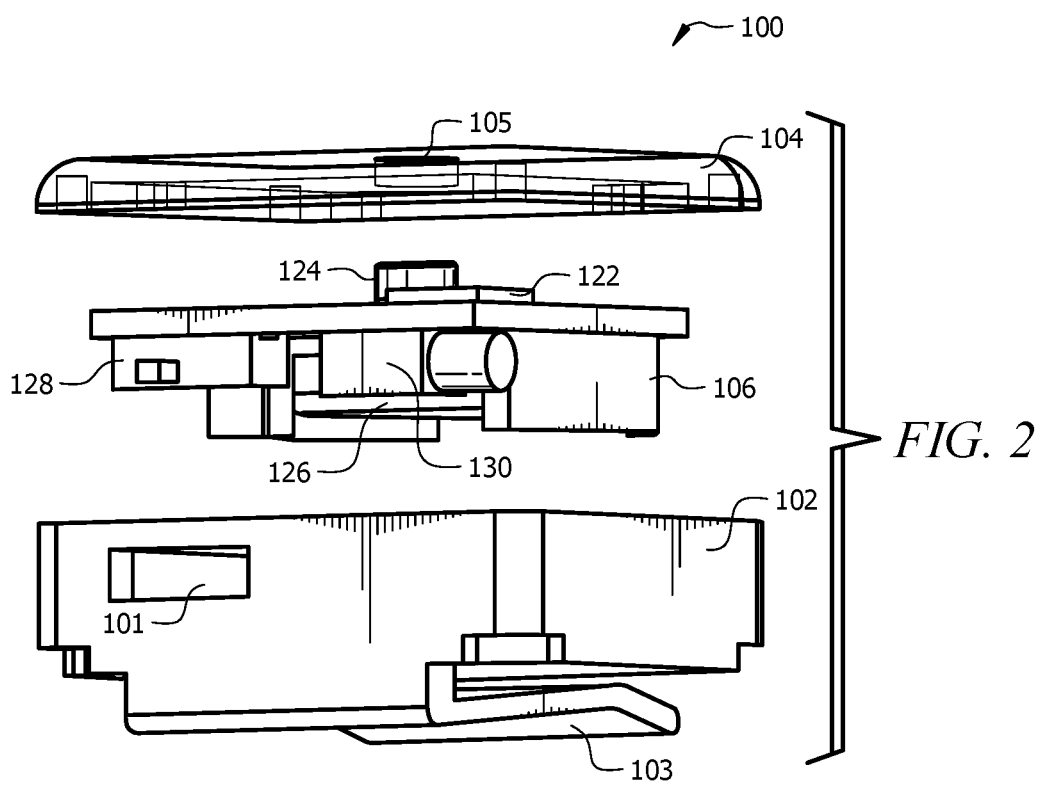
FIG. 2 illustrates a side, exploded view of a temperature sensor according to an embodiment of the disclosure.

Referring now to FIG. 1 and FIG. 2, an exemplary temperature sensor 100 is shown, wherein the sensor 100 comprises a bottom housing 102 and a top housing 104. FIG. 1 illustrates a perspective, exploded view of the sensor 100, while FIG. 2 illustrates a side, exploded view of the sensor 100. The sensor 100 may comprise a standoff temperature sensor element 124, which may in some embodiments comprise a thermopile configured to determine the temperature of an object and/or surface in the vicinity of the user. The top housing 104 may comprise an opening 105 to allow at least a portion of the standoff temperature sensor element 124 to be exposed to the external environment. In some embodiments, a portion of the standoff temperature sensor element 124 may protrude from the top housing 104 via the opening 105 when the sensor 100 is assembled. The standoff temperature sensor element 124 may be installed onto a printed circuit board (PCB) 120. A microcontroller 122, and optionally other electrical components, may be installed onto the PCB 120, wherein the standoff temperature sensor element 124 may be configured to communicate with the microcontroller 122.

The sensor 100 may comprise a switch and/or button 128 to allow a user to turn the sensor on and off. The switch and/or button 128 may also allow a user to input other commands to the microcontroller 122, where the switch 128 may be installed onto the PCB 120. In some embodiments, the switch 128 may be configured to allow use by a gloved hand and/or may be configured to prevent accidental operation. The bottom housing 102 may comprise an opening 101 to allow access to the switch 128. Optionally, a portion of the switch 128 may protrude from the bottom housing 102 via the opening 101 when the sensor 100 is assembled. The sensor 100 may comprise a battery 126 configured to power the other components of the sensor 100. In the specific embodiment shown in FIGS. 1 and 2, the sensor 100 may comprise a battery housing 106 configured to hold the battery 126 and to fit within the top housing 104 and bottom housing 102 when the sensor 100 is assembled. In some embodiments, the housing (e.g., the top housing 104 and/or the bottom housing 102) may comprise insulation and/or otherwise be configured to insulate the internal components (e.g., within the housing) from extreme heat (for example, preventing the heat of a fire rescue situation from melting or otherwise damaging the microcontroller). Such insulation may only be sufficient for one or two (or one to three) fire rescue situations, for example if disposable.

[Details]

The sensor 100 may comprise an indicator 130 configured to receive information and/or instructions from the microcontroller 122. The indicator 130 may comprise an audible and/or visible alert to the user. In some embodiments, the indicator 130 may comprise a light, a multi-color light, a speaker, a buzzer, or another similar indicator device. In the specific embodiment shown in FIGS. 1 and 2, the indicator 130 may comprise a vibrating motor configured to, when activated, move in such a way as to produce a vibration that may be felt by the user. For example, the indicator 130 may produce a vibration that may be felt through the top and bottom housing 104 and 102, as well as any PPE that is worn by the user, such as a glove.

As shown in FIG. 2, the bottom housing 102 may comprise an attachment element 103 configured to attach the sensor 100 to a PPE worn and/or carried by the user. The attachment element 103 may comprise a clip, snap, clasp, hook, or any other physical attachment element 103 configured to interface with a PPE. In FIG. 2, the attachment element 103 is a removable attachment element, configured to securely but removably attach to a PPE.

Figure 3:
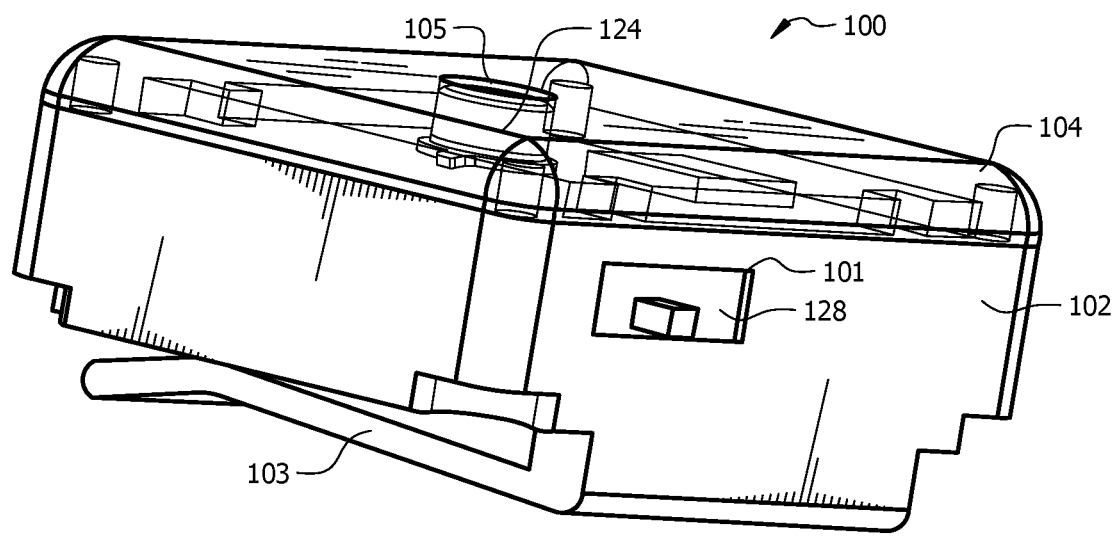
FIG. 3 illustrates an assembled view of a temperature sensor according to an embodiment of the disclosure.

FIG. 3 illustrates an assembled view of the sensor 100 described above. The top housing 104 may be attached to the bottom housing 102. The opening 105 of the top housing 104 may expose a portion of the standoff temperature sensor element 124 to the external environment. The opening 101 of the bottom housing 102 may allow a user to access the switch 128 to control the sensor 100.

Figure 4:
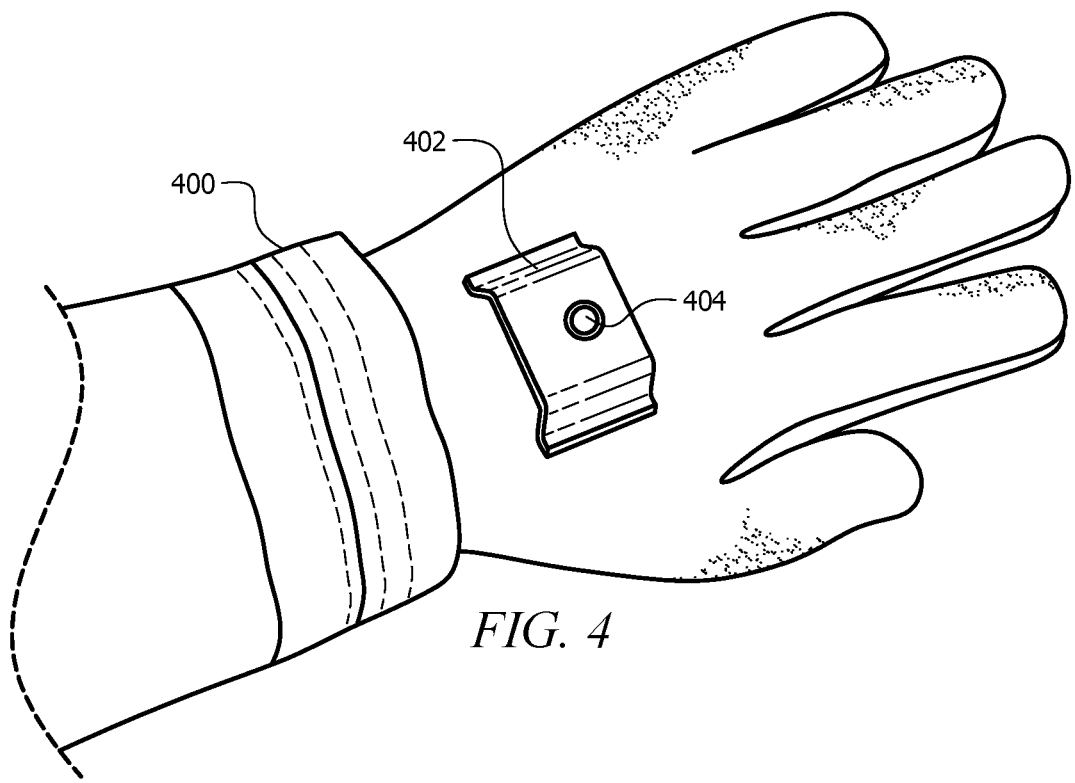
FIG. 4 illustrates a PPE that may be worn by a user according to an embodiment of the disclosure.

FIG. 4 illustrates a PPE 400 (e.g. a glove) that may be worn by a user. Typically, the PPE glove 400 would be insulating and/or insulated and configured to protect the wearer while in a fire rescue situation. The PPE glove 400 may comprise another attachment element 402 (which may be a pocket, strap, or slot) configured to interface with the attachment element 103 of the sensor 100 (shown in FIGS. 1-3). For example, the attachment element 103 may comprise a clip that is shaped to fit snugly and removably into the pocket 402 on the back of the PPE glove 400. The position of the pocket 402 (and therefore the sensor) may allow a user to place the sensor in close proximity to the object or surface to determine the temperature. In some embodiments, the sensor may be placed within the pocket 402, wherein a portion of the sensor (such as the standoff temperature sensor element) may still be exposed to the external environment. In some embodiments, another attachment element 404 may secure the sensor to the PPE glove 400. In some embodiments, the sensor 100 may be mounted to the back of a glove (e.g., the back of the glove may have the pocket 402 or other matching/corresponding attachment element 404 mounted on it), so the sensor may be readily available without interfering with hand use.

As described above, the embodiments of the disclosure comprise a calibrated, digital thermopile sensor interfaced to a low power microcontroller that receives the sensor data, calculates the temperature, compares it to a (or one or more) preset temperature threshold (or otherwise determines that an indication is needed), and activates an indicator (such as a vibrating motor) if the thermopile senses a temperature greater than the preset threshold. If the comparison is to a plurality of preset temperature thresholds, the intensity of the indication can correspond to the specific threshold at issue. Alternatively, a lookup table could be used to determine if an indication should be activated, and if so the intensity may be selected via the look-up table from preset intensity levels corresponding to different detected temps. The housing may include an integrated clip that is intended to attach directly to the back of a firefighter glove.

As an example, if a firefighter would like to determine if an object (e.g., a door to an adjacent room, the air around the firefighter, etc.) is hot, the temperature sensor could be positioned near, but not necessarily in contact with, the object (e.g., in proximity and/or pointed at the object, within a range of about 1 inch to about 10 feet). The temperature sensor can then determine the temperature of the object and provide an output indicative of the temperature of the object (e.g., noting if it is over a preset temperature threshold that is dangerous and/or providing an indication of the intensity). Taking the door to a room as an example, the temperature sensor could be placed in contact with the door or simply near the door with the opening aimed at the door. The output of the sensor could then be used to indicate whether or not the door was above a threshold temperature. This would allow the temperature to be sensed without the firefighter needing to remove any PPE such as the insulated gloves and/or without the firefighter having to hold a temperature sensor in hand. If the sensor is removable and disposable, the firefighter might attach a temperature sensor (e.g., taken from a plurality of stored identical sensors) to PPE, and after use (e.g., after a single fire rescue situation) might detach and dispose of the used temperature sensor. Another sensor could be removably attached to PPE for use in the next fire rescue situation (e.g., replacing disposable sensors after each event/use).

Embodiments described herein may provide firefighters with an indication of high temperatures in their environment without requiring them to take off their gloves and physically tough objects or surfaces, which is dangerous and expressly forbidden in many first responder situations. The sensor may be very low cost (to the point of being optionally disposable).

Having described various devices and methods herein, exemplary embodiments or aspects can include, but are not limited to:

In a first embodiment, a temperature sensor configured to be attached to a personal protection equipment may comprise a standoff temperature sensor element configured to detect the temperature of a nearby object or surface; a microcontroller configured to receive sensor data from the standoff temperature sensor element and determine the sensed temperature; an indicator configured to be activated by the microcontroller when the sensed temperature is higher than a predefined threshold; and an attachment element configured to attach the sensor to a personal protection equipment worn by a user.

A second embodiment can include the temperature sensor of the first embodiment, further comprising a housing configured to enclose the elements of the sensor, wherein at least a portion of the standoff temperature sensor element is exposed to the external environment by an opening in the housing.

A third embodiment can include the temperature sensor of the first or second embodiments, further comprising a switch configured to allow a user to control the sensor.

A fourth embodiment can include the temperature sensor of any of the first to third embodiments, wherein the indicator comprises a vibrating motor.

A fifth embodiment can include the temperature sensor of any of the first to fourth embodiments, wherein the indicator comprises an audible alert.

A sixth embodiment can include the temperature sensor of any of the first to fifth embodiments, wherein the indicator comprises a visible alert.

A seventh embodiment can include the temperature sensor of any of the first to sixth embodiments, wherein the attachment element comprises a clip, and wherein the personal protection equipment comprises a slot or pocket configured to receive the clip.

An eighth embodiment can include the temperature sensor of any of the first to seventh embodiments, wherein the personal protection equipment comprises a glove, and wherein the sensor is attached to the back of the user's hand via the glove.

A ninth embodiment can include the temperature sensor of any of the first to eighth embodiments, wherein the temperature sensor does not comprise a thermal imaging element.

In a tenth embodiment, a method for determining the temperature of an object or surface near a user may comprise positioning a standoff temperature sensor element of a temperature sensor in proximity to the object or surface; receiving, by a microcontroller of the temperature sensor, sensed data from the standoff temperature sensor element; determining a sensed temperature based on the received sensed data; determining when the sensed temperature is higher than a predefined threshold; and activating an indicator when the sensed temperature is higher than the predefined threshold.

An eleventh embodiment can include the method of the tenth embodiment, further comprising attaching the temperature sensor to a personal protection equipment worn by the user.

A twelfth embodiment can include the method of the eleventh embodiment, wherein attaching the temperature sensor to the personal protection equipment comprises attaching the temperature sensor to the backside of a glove.

A thirteenth embodiment can include the method of any of the tenth to twelfth embodiments, wherein activating the indicator comprises one or more of the following: activating a vibrating motor to generate a vibration that is felt by the user; activating an audible alert; and activating a visible alert.

A fourteenth embodiment can include the method of any of the tenth to thirteenth embodiments, further comprising exposing the standoff temperature sensor element to the ambient temperature via an opening in a housing of the temperature sensor.

A fifteenth embodiment can include the method of any of the tenth to fourteenth embodiments, further comprising determining a local temperature by the user without the user removing the personal protection equipment and/or without holding a temperature sensor in the user's hand, and/or detaching and/or disposing of the temperature sensor after use in a fire rescues situation and/or replacing the temperature sensor with a new one before the next fire rescue situation.

In a sixteenth embodiment, a personal protection equipment may comprise an attachment element located on a portion of the personal protection equipment; and a temperature sensor configured to (removably) attach to the attachment element, wherein the temperature sensor comprises: a standoff temperature sensor element configured to detect the temperature of a nearby object or surface; a microcontroller configured to receive sensor data from the standoff temperature sensor element and determine the sensed temperature; an indicator configured to be activated by the microcontroller when the sensed temperature is higher than a predefined threshold; and an attachment element configured to attach the sensor to a personal protection equipment worn by a user.

A seventeenth embodiment can include the personal protection equipment of the sixteenth embodiment, wherein the temperature sensor further comprises a housing configured to enclose the elements of the sensor, wherein at least a portion of the standoff temperature sensor element is exposed to the external environment by an opening in the housing.

An eighteenth embodiment can include the personal protection equipment of any of the sixteenth to seventeenth embodiments, wherein the temperature sensor further comprises a switch configured to allow a user to control the sensor.

A nineteenth embodiment can include the personal protection equipment of any of the sixteenth to eighteenth embodiments, wherein the indicator comprises a vibrating motor.

A twentieth embodiment can include the personal protection equipment of any of the sixteenth to nineteenth embodiments, wherein the personal protection equipment comprises a glove, and wherein the sensor is attached to the back of the user's hand via the glove.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A temperature sensor configured to be attached to an item of personal protection equipment, the temperature sensor comprising:
   a standoff temperature sensor element configured to sense the temperature of a nearby object or surface, wherein the standoff temperature sensor element includes a thermopile;
   a microcontroller configured to receive sensor data from the standoff temperature sensor element and determine the sensed temperature;
   an indicator configured to be activated by the microcontroller when the sensed temperature is higher than a predefined threshold;
   a housing, wherein the standoff temperature sensor element, the microcontroller, and the indicator are disposed within the housing, and wherein the housing comprises an insulation to insulate the standoff temperature sensor element, the microcontroller, and the indicator from heat; and
   an attachment element,
      wherein the attachment element is configured to securely but removably attach to the personal protection equipment,
      wherein the attachment element comprises a clip,
      wherein the personal protection equipment comprises a slot, a strap, or a pocket configured to receive the clip, and
      wherein the temperature sensor is configured to removably attach to the personal protection equipment via the attachment element.

2. The temperature sensor of claim 1, wherein at least a portion of the standoff temperature sensor element is exposed to an external environment by an opening in the housing.

3. The temperature sensor of claim 1, further comprising a switch configured to allow a user to control the temperature sensor.

4. The temperature sensor of claim 1, wherein the indicator comprises a vibrating motor.

5. The temperature sensor of claim 1, wherein the indicator comprises an audible alert.

6. The temperature sensor of claim 1, wherein the indicator comprises a visible alert.

7. The temperature sensor of claim 1, wherein the personal protection equipment comprises a glove, and wherein the temperature sensor is attached to a back of a user's hand via the glove.

8. The temperature sensor of claim 1, wherein the temperature sensor does not comprise a thermal imaging element.

9. A method for determining the temperature of an object or surface near a user, the method comprising:
   removably attaching an attachment element to a personal protection equipment, wherein the attachment element comprises a clip, and wherein the personal protection equipment comprises a slot, a strap, or a pocket configured to receive the clip,
   removably attaching a temperature sensor to the personal protection equipment via the attachment element,
   wherein the temperature sensor comprises a housing,
   wherein a standoff temperature sensor element, a microcontroller, and an indicator are disposed within the housing,
   wherein the housing comprises an insulation to insulate the standoff temperature sensor element, the microcontroller, and the indicator from heat,
   wherein the standoff temperature sensor element is in proximity to the object or surface,
   and wherein the standoff temperature sensor element includes a thermopile;
   receiving, by the microcontroller of the temperature sensor, sensed data from the standoff temperature sensor element;
   determining a sensed temperature based on the received sensed data;
   determining when the sensed temperature is higher than a predefined threshold; and
   activating the indicator when the sensed temperature is higher than the predefined threshold.

10. The method of claim 9, wherein activating the indicator comprises one or more of the following:
   activating a vibrating motor to generate a vibration that is felt by the user;
   activating an audible alert; and
   activating a visible alert.

11. The method of claim 9, further comprising exposing the standoff temperature sensor element to ambient temperature via an opening in the housing of the temperature sensor.

12. The method of claim 9, further comprising determining a local temperature by the user without the user removing the personal protection equipment.

13. The method of claim 9, wherein removably attaching the temperature sensor to the personal protection equipment via the attachment element comprises attaching the temperature sensor to the personal protection equipment worn by the user.

14. The method of claim 13, wherein removably attaching the temperature sensor to the personal protection equipment comprises attaching the temperature sensor to a backside of a glove.

15. A personal protection equipment comprising:
   a temperature sensor attached to the personal protection equipment via an attachment element, the temperature sensor comprising:
      a standoff temperature sensor element to sense the temperature of a nearby object or surface, wherein the standoff temperature sensor element includes a thermopile;
      a microcontroller configured to receive sensor data from the standoff temperature sensor element and determine the sensed temperature;
      an indicator configured to be activated by the microcontroller when the sensed temperature is higher than a predefined threshold;
      a housing, wherein the standoff temperature sensor element, the microcontroller, and the indicator are disposed within the housing and wherein the housing, comprises an insulation to insulate the standoff temperature sensor element, the microcontroller, and the indicator from heat; and
      the attachment element, wherein the attachment element is configured to securely but removably attach to the personal protection equipment, and wherein the attachment element comprises a clip, and the personal protection equipment further comprising a slot, a strap, or a pocket configured to receive the clip, wherein the temperature sensor is configured to removably attach to the personal protection equipment via the attachment element.

16. The personal protection equipment of claim 15, wherein at least a portion of the standoff temperature sensor element is exposed to an external environment by an opening in the housing.

17. The personal protection equipment of claim 15, wherein the temperature sensor further comprises a switch configured to allow a user to control the temperature sensor.

18. The personal protection equipment of claim 15, wherein the indicator comprises a vibrating motor.

19. The personal protection equipment of claim 15, wherein the personal protection equipment comprises a glove, and wherein the temperature sensor is attached to a back of a user's hand via the glove.

\* \* \* \* \*